United States Patent
Kanke et al.

(10) Patent No.: US 6,904,793 B2
(45) Date of Patent: Jun. 14, 2005

(54) AIR FLOW METER

(75) Inventors: Atsushi Kanke, Hitachi (JP); Kohei Sakurai, Hitachi (JP); Masatoshi Hoshino, Tsuchiura (JP); Nobuyasu Kanekawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/270,497

(22) Filed: Oct. 16, 2002

(65) Prior Publication Data

US 2003/0070494 A1 Apr. 17, 2003

(30) Foreign Application Priority Data

Oct. 16, 2001 (JP) ........................................ 2001-318444

(51) Int. Cl.⁷ .............................................. G01P 5/00
(52) U.S. Cl. ...................................................... 73/118.2
(58) Field of Search ................................ 123/399, 478, 123/494, 308; 73/118.2, 204.25, 204.26, 204.16, 204.21, 202

(56) References Cited

U.S. PATENT DOCUMENTS

| | | | | |
|---|---|---|---|---|
| 4,303,129 A | * | 12/1981 | Mills ............................ | 73/204 |
| 4,391,132 A | * | 7/1983 | Egami et al. .................. | 73/118 |
| 4,418,673 A | * | 12/1983 | Tominari et al. ............. | 123/478 |
| 4,974,445 A | * | 12/1990 | Arai et al. .................... | 73/118.2 |
| 5,817,932 A | * | 10/1998 | Nishimura et al. ......... | 73/118.2 |
| 6,435,023 B1 | * | 8/2002 | Kobayashi et al. ......... | 73/204.25 |
| 6,681,742 B1 | * | 1/2004 | Hirayama et al. .......... | 123/399 |

FOREIGN PATENT DOCUMENTS

| | | |
|---|---|---|
| EP | 0 902 261 A1 | 3/1999 |
| EP | 1 195 511 A1 | 4/2002 |
| JP | 06-288291 | 10/1994 |
| JP | 07-139984 | 6/1995 |
| JP | 08-218934 | 8/1996 |
| JP | 09-053482 | 2/1997 |
| WO | 00/77376 A1 | 12/2000 |

* cited by examiner

*Primary Examiner*—Eric S. McCall
*Assistant Examiner*—Octavia Davis
(74) *Attorney, Agent, or Firm*—Crowell & Moring LLP

(57) ABSTRACT

An air flow meter which can decrease the error due to the backflow. Throttle valve 17 which opens and shuts the air intake passage is installed in the air intake passage of the internal combustion engine. The first sensor part 161 is installed in the air intake passage in the upstream of throttle valve 17. Further, the second sensor part 141 is installed in the air intake passage in the downstream of throttle valve 17. Pulsation compensating means 671 corrects the pulsation of the air flow rate signal detected by the first sensor part by using the output signals of the first and the second sensor parts 161, 141 based on each cylinder of the internal combustion engine.

16 Claims, 12 Drawing Sheets

AIR FLOW METER

BACKGROUND OF THE INVENTION

The present invention relates to an air flow meter for measuring an air flow rate, and specifically to an air flow meter so configured as to be integrated with a throttle for controlling an air-intake of the internal combustion engine.

Conventionally, as for the air flow meter for measuring the air-intake of the internal combustion engine such as automotive engine, thermal type air flow meters are commonly used because they can detects mass-flow rate directly. The heating resistance used here includes a platinum wire winded around a bobbin and coated with glass and a thin-film resistance formed on the ceramic substrate or a silicon substrate. As for the method for measuring the flow rate, there are several well known methods including a method in which the current supplied in the heating resistance for heating the heating resistance at a constant temperature is measured directly and a method in which temperature detecting resistances are placed at upstream side and downstream side of the heating resistance and a temperature difference between those temperature detecting resistances is measured.

As for the method for controlling the inlet air flow, a method for opening and closing an air intake passage by using a throttle valve. Specifically, electronic control throttle systems for controlling electrically the throttle valve by using a motor are generally used due to its excellent control performance.

There is such a problem that the control accuracy is reduced in case of applying a conventional heating-resistance type air flow meter to four or less cylinder automotive engines and for the lower engine speed operation or the overloaded operation in which the pulsation in the intake air flow arises and its amplitude is large and counter flow is formed partially. In order to solve this problem, there is such a solution that plural heating-resistance type air flow meters are placed at the upstream side of the throttle and the counter flow is detected by measuring the phase signal s from those air flow meters, and the control error may be reduced resultantly as disclosed, for example, in Japanese Patent Publication No. 2855401. In addition, there is another solution, as disclosed in Japanese Patent Application Laid-Open Number 6-288291 (1994) and Japanese Patent Application Laid-Open No. 8-218934 (1996) in which the control error including the pulsation effect in the air flow rate measured by the heat-resistance type air flow meter placed at the upstream of the throttle is compensated by referring to the output from the pressure sensor placed at the downstream of the throttle, and the control error may be reduced resultantly.

In attempting to integrating the throttle apparatus and the air flow meter, there arises another problem in which the measurement error for the air flow rate increases due to the changes in the throttle valve opening. In order to solve this problem, there is such a known solution as disclosed, for example, in Japanese Patent Application Laid-Open No. 9-53482 (1997) in which the measurement error may be reduced by optimizing the configuration and layout of the air flow meter in relative to the throttle valve.

However, there is a first problem that the error due to the backflow is not decreased sufficiently because the error due to the backflow increases in the internal combustion engine using variable valve mechanism, in the methods described in Japanese Patent No.2855401, Japanese Patent Application Laid-Open No.6-288291 and Japanese Patent Application Laid-Open No. 8-218934.

Further, there is a second problem that the measurement error to the change of opening of the throttle valve is not decreased sufficiently in the methods described in Japanese Patent Application Laid-Open No.9-53482.

Further, there is a second problem that the operational state of the throttle device has not been diagnosed when the electronically controlled throttle is used in the conventional air flow meter.

Further, there is a fourth problem that when there are a lot of engine cylinders in the conventional air flow meter, it is not possible to detect directly the mass air flow rate and to detect the air flow rate every cylinder.

SUMMARY OF THE INVENTION

A first object of the present invention is to provide an air flow meter which can decrease the error due to the backflow.

A second object of the present invention is to provide an air flow meter which can decrease the measurement error to the change of opening of the throttle valve.

A third object of the present invention is to provide an air flow meter which can diagnose the operational state of the throttle device.

A fourth object of the present invention is to provide an air flow meter which can detect the air flow rate every cylinder.

(1) To achieve the above first object, the present invention takes the following configuration.

An air flow meter comprising
- a throttle valve installed inside an intake passage of an internal combustion engine and used for opening and closing an intake passage;
- a first air flow rate detecting means installed in an intake passage located in the upstream of said throttle valve;
- a second air flow rate detecting means installed in an intake passage located at the downstream of said throttle valve; and
- a pulsation compensating means for compensating a pulsation in an air flow rate signal of said first air flow rate detecting means based on output signals from said first and second air flow rate detecting means corresponding individual cylinders of said internal combustion engine.

The error due to the backflow can be decreased by this configuration.

(2) Preferably, in above-mentioned (1), said pulsation compensating means determines a response compensatory signal Qfd by compensating a response delay of air flow rate signal Qf detected by said first air flow rate detecting means;

determines a deviation signal dQfdb by subtracting an air flow rate signal Qd detected by said second air flow rate detecting means from said response compensatory signal Qfd; and determines an air flow rate signal Qref compensated for pulsation effect by subtracting said deviation signal dQfdb from an air flow rate signal Qf detected by said first air flow rate detecting means.

(3) To achieve the second object, preferably in the above-mentioned (1), the air flow meter further comprises;

a throttle valve opening compensating means for compensating a deviated flow changing due to throttle valve opening, wherein a deviated flow changing due to throttle opening in an air flow rate signal compensated by said pulsation compensating means is corrected based on a compensation value for deviated flow due to throttle opening obtained by said throttle opening compensating means.

The measurement error to the opening change of the throttle valve can be decreased by this configuration.

(4) Preferably, in the above-mentioned (1), at least one or more of said first and second air flow rate detecting means for a throttle valve are integrated with a body of said throttle valve.

(5) Preferably, in the above-mentioned (1), said first and second air flow rate detecting means for a throttle valve are air flow rate detecting means using a heating resistance, and at least one or more are sensors enable to detect a counter flow.

(6) Preferably, in the above-mentioned (1), either of said plural first and second air flow rate detecting means for a throttle valve is detachable to said throttle body, which is installed at manufacturing process and used for adjusting a characteristic.

(7) To achieve the third above-mentioned object, the present invention takes the following configuration: An air flow meter comprising a throttle valve installed inside an intake passage of an internal combustion engine and used for opening and closing an intake passage;

a first air flow rate detecting means installed in an intake passage located in the upstream of said throttle valve;

a second air flow rate detecting means installed in an intake passage located at the downstream of said throttle valve; and a calculating means for estimating an air flow rate corresponding to a single cylinder based on an difference between output signals from said first and second air flow rate detecting means.

(8) Preferably, in the above-mentioned (7), said throttle diagnostic processing means detects an abnormal throttle state if a time duration while a deviation signal dQfdb between an air flow rate signal Qf detected by said first air flow rate detecting means and an air flow rate signal Qd detected by said second air flow rate detecting means continues to deviate outside levels sH and sL is judged to be larger than a designated value.

(9) Preferably, in the above-mentioned (7), at least one or more of said first and second air flow rate detecting means for a throttle valve are integrated with a body of said throttle valve.

(10) To achieve the fourth above-mentioned object, the present invention takes the following configuration.

An air flow meter comprising:

a throttle valve installed inside an intake passage of an internal combustion engine and used for opening and closing an intake passage;

a first air flow rate detecting means installed in an intake passage located in the upstream of said throttle valve;

a second air flow rate detecting means installed in an intake passage located at the downstream of said throttle valve; and a calculating means for estimating an air flow rate corresponding to a single cylinder based on a difference between output signals from said first and second air flow rate detecting means.

DETAILED DESCRIPTION OF THE PREFERRED EMBODIMENTS

Hereafter, the configuration and the operation of the air flow meter according to the first embodiment of the present invention will be explained by using FIG. 1–FIG. 10.

First, the whole configuration of the internal combustion engine provided with the air flowmeter according to this embodiment will be explained by using FIG. 1 first.

Figure 1:
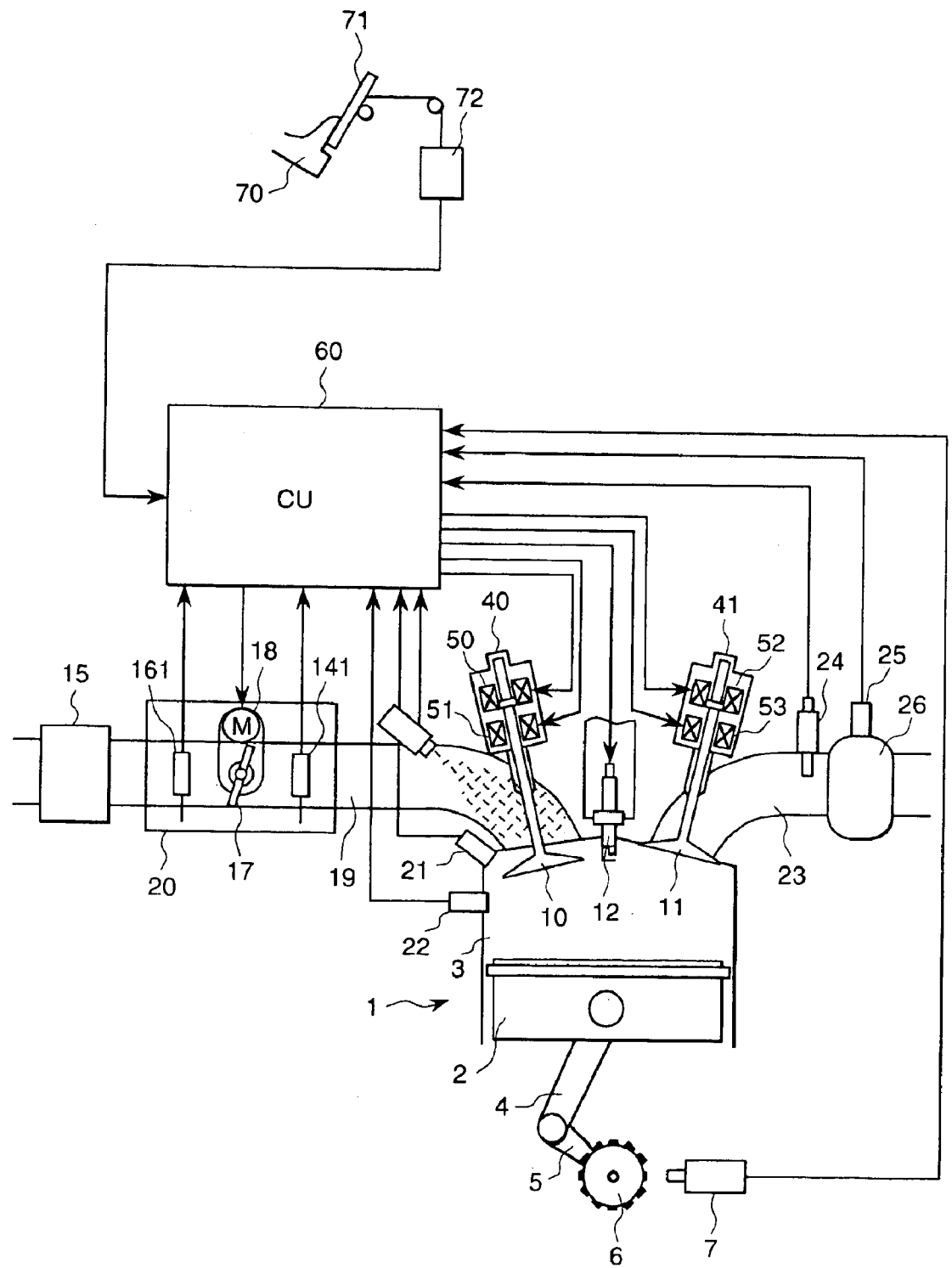
FIG. 1 is a system configuration view showing the whole configuration of an internal combustion engine which has the air flow meter according to the first embodiment of the present invention.

FIG. 1 is a system configuration view showing the whole configuration of an internal combustion engine which has the air flow meter according to the first embodiment of the present invention.

Engine 1 has a crank chain comprising con'rod 4 and crank shaft 5. Combustion chamber 3 is formed with piston 2 connected to the crank chain and engine head 8 of engine 1. Combustion chamber 3 is sealed up with intake valve 10 installed in engine head 8, exhaust valve 11, and sparking plug 12. Intake valve 10 and exhaust valve 11 are operated by variable valve mechanism 40 and 41. Engine 1 inhales air necessary for combustion into combustion chamber 3 by the operation of throttle valve 17 and the reciprocating motion of piston 2. The dust and foreign particles included in air inhaled into engine 1 are removed in air cleaner 15. The amount of intake air used for the calculation of fuel injection amount is measured by sensor part 161,141 of the air flow meter in throttle-integrated air flow meter 20. Sensor part 161 is arranged on the upstream side of throttle valve 17, and sensor part 141 is arranged on the downstream side of throttle valve 17. Because the combustion chamber 3 and intake port 19 in the downstream of throttle valve 17 becomes a negative pressure lower than the atmospheric pressure when the opening of throttle valve 17 is small, the change of the amount of the intake air due to the pressure in the intake pipe is always measured and reflected to the control of engine 1. Control unit (CU) 60 by which engine 1 is controlled detects the operating state of engine 1 based on the signals from various sensors, controls the operation of variable valve mechanism 40, 41 installed in engine 1, and also controls the fuel amount injected from fuel injection valve 13 and the fuel injection timing are controlled.

The manipulated variable of accelerator pedal 71 operated by driver 70 for the vehicle where engine 1 is installed is converted into the electric signal by potentiometer 72, and input to control unit 60. Additionally input to control unit 60 as a signal which detects the operating state, an engine revolution speed from the crank angle sensors 6, 7 installed in crank shaft 5 for instance, an air flow rate signal from sensor part 161,141 in throttle-integrated flow meter 20, an air/fuel ratio signal from air/fuel ratio sensor installed in exhaust pipe 23, an exhaust gas temperature signal from temperature sensor 25 which detects the temperature of exhaust catalyst 26, an in-cylinder pressure signal of pressure sensor 21 which detects the pressure in combustion chamber 3, and a knocking signal from knocking sensor 22 by which the knocking are detected. Control unit 60 outputs a control signal to the signal of the input operating state, controls motor 18 which actuates throttle valve 17 and variable valve mechanism 40 by which intake valve 10 are actuated, and adjusts the amount of the air inhaled into engine 1. Control unit 60 outputs a control signal to fuel injection valve 13 according to the operating state, and adjusts the fuel injection amount and the fuel injection timing.

Next, the configuration of the air flow meter according to this embodiment will be explained by using FIG. 2.

Figure 2:
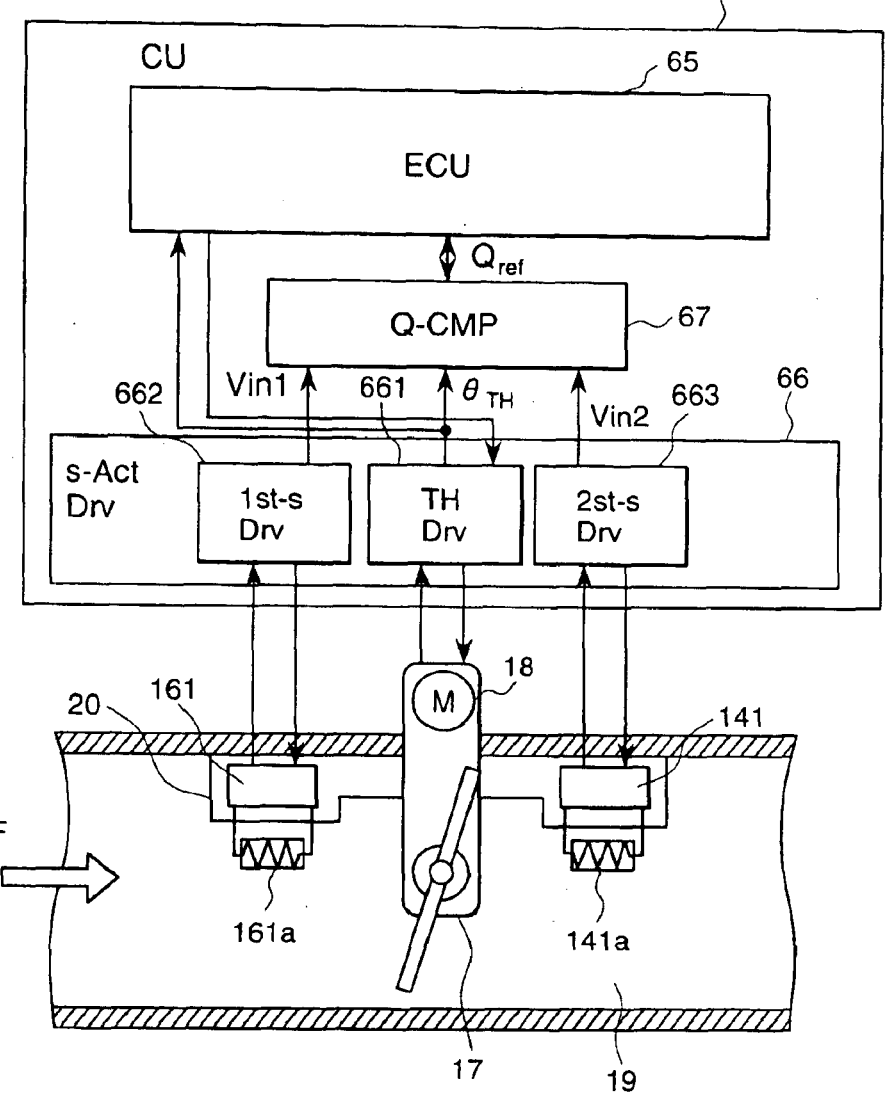
FIG. 2 is a system configuration view showing the configuration of the air flow meter according to the first embodiment of the present invention.

FIG. 2 is a system configuration view showing the configuration of the air flow meter according to the first embodiment of the present invention.

Throttle valve 17 is driven by motor 18. The first sensor part 161 which includes heat resistor 161a is installed in the upstream of throttle valve 17. The second sensor part 141 which includes heat resistor 141a is installed in the downstream of throttle valve 17. The first sensor part 161 and the second sensor part 141 are integrated with throttle valve 17 and motor 18 to form throttle-integrated air flow meter 20.

control unit 60 is provided with sensor actuator driving means (S-Act Drv) 66, air flow rate correction means (Q-CMP) 67, and engine control unit (ECU) 65. First sensor drive circuit (first-S Drv) 662 by which the first sensor part 161 is driven, second sensor drive circuit (2st-S Drv) 663 by which the second sensor part 141 are driven, and throttle drive circuit (TH Drv) 661 which drives throttle valve 17 are provided in sensor actuator driving means 66. First sensor drive circuit 662, second sensor drive circuit 663, and throttle drive circuit 661 may be provided in throttle-integrated air flow meter 2 besides control unit 60. An output Vin1, Vin2 of each of sensor drive circuit 662, 663, and an output θTH of throttle drive circuit 661 are input to air flow rate correction means 67. Air flow rate correction means 67 corrects the error of the measured air flow rate, and outputs the corrected signal of the air flow rate Qref to engine control unit 65. Engine control unit 65 controls the engine based on the air flow rate Qref output from the air flow rate correction means 67, the output θTH of throttle drive circuit 661, etc.

Next, the configuration of the first air flow meter according to this embodiment will be explained by using FIG. 3.

Figure 3:
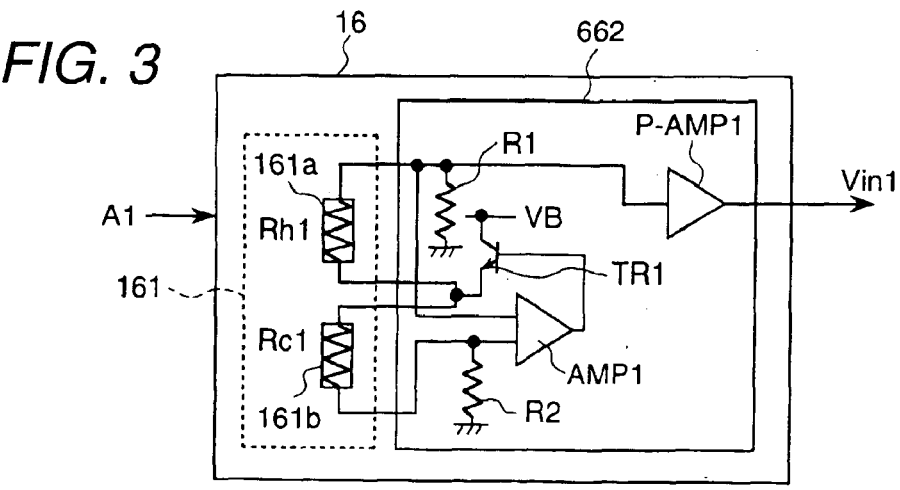
FIG. 3 is a circuit diagram showing the configuration of the first air flow meter according to the first embodiment of the present invention.

FIG. 3 is a circuit diagram showing the configuration of the first air flow meter according to the first embodiment of the present invention.

First sensor part 161 includes temperature compensating resistor 161b besides heat resistor 161a shown in FIG. 2. First sensor drive circuit 662 has resistors R1, R2, error amplifier AMP1, preamplifier P-AMP1, and transistor TR1. Heat resistor 161a, temperature compensating resistor 161b, and resistors R1 and R2 compose a bridge circuit. First sensor part 161 and first sensor drive circuit 662 compose first air flow meter 16 described later in FIG. 5.

Error amplifier AMP1 controls transistor TR1 so as to balance the bridge circuit, and controls so that the temperature of heat resistor 161a can become higher by a constant temperature than that of temperature compensating resistor 161b. Here, because the electric current which flows to heat resistor 161a changes so that the bridge circuit can be balanced when the temperature of the heating resistor 161a deprived of heat by intake air A1 changes, and thus the temperature of heating resistor 161a is kept to a constant temperature, it becomes possible to measure the intake air amount by using the electric current which flows to heat resistor 161a. The electric current which flows to heat resistor 161a is amplified by preamplifier P-AMP1, and output as first sensor output Vin1. Because temperature compensating resistor 161b detects the temperature of the intake air, the error due to the temperature of the intake air can be corrected.

Here, the resistor formed by winding the platinum line around the bobbin and then by coating it with the glass, or the thin film resistor body formed on a ceramic substrate or a silicon substrate is used as heat resistor 161a, for example. That is, the heat capacity is a comparatively large. Therefore, and an excellent resistor in the detection of the static characteristic is obtained although unsuitable to the measurement of the flow direction and the measurement which needs a high-speed response.

Next, the configuration of the second air flow meter according to this embodiment will be explained by using FIG. 4.

Figure 4:
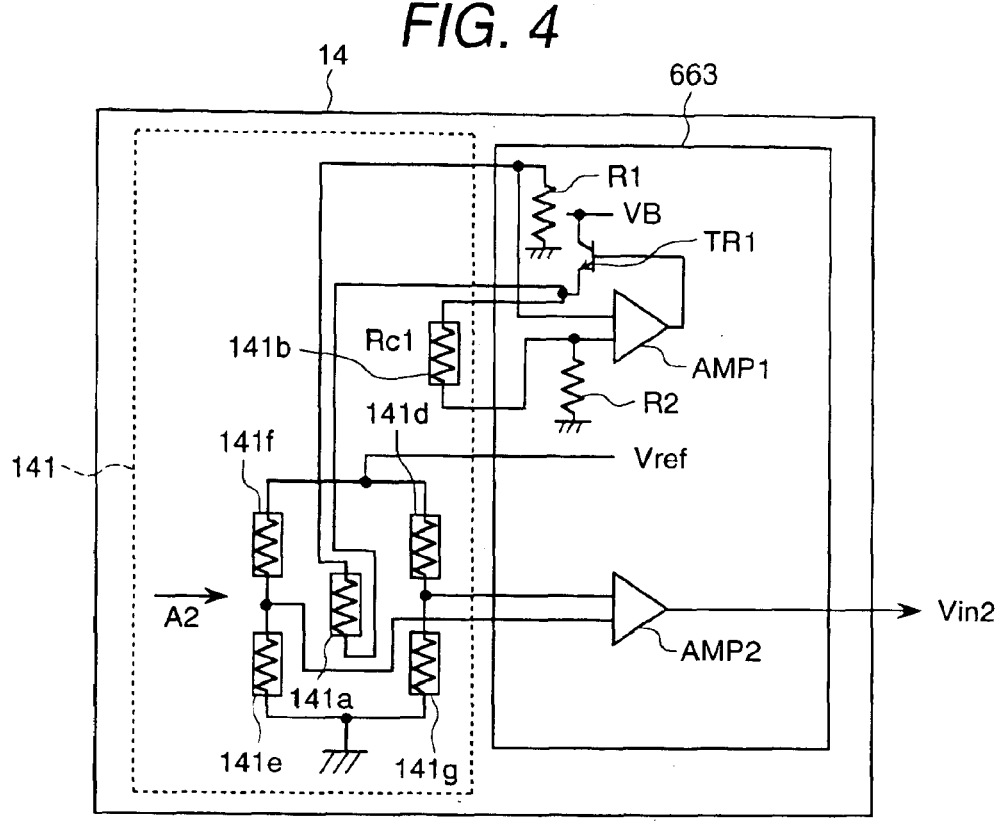
FIG. 4 is a circuit diagram showing the configuration of the second air flow meter according to the first embodiment of the present invention.

FIG. 4 is a circuit diagram showing the configuration of the second air flow meter according to the first embodiment of the present invention.

Second sensor part 141 includes temperature compensating resistor 141b and temperature detection resistors 141d, 141e, 141f, 141g besides heat resistor 141a shown in FIG. 2. Second sensor drive circuit 663 has resistors R1, R2, error amplifier AMP1, error amplifier AMP2, and transistor TR1. Heat resistor 141a, temperature compensating resistor 141b, and resistors R1 and R2 compose a bridge circuit. Second sensor part 141 and second sensor drive circuit 664 compose second air flow meter 14 described later in FIG. 5.

Error amplifier AMP1 controls transistor TR1 so as to balance the bridge circuit, and controls so that the temperature of heat resistor 141a can become higher by a constant temperature than that of temperature compensating resistor 141b. Here, the electric current which flows to heat resistor 141a changes so that the bridge circuit can be balanced when the temperature of the heating resistor 141a deprived of heat by intake air A2 changes, and thus the temperature of heating resistor 141a is kept to a constant temperature. Because temperature compensating resistor 161b detects the temperature of the intake air, the error due to the temperature of the intake air can be corrected.

Temperature detection resistors 141d and 141e are arranged on the upstream side of air stream A2 with respect to heat resistor 141a, and temperature detection resistors 141f and 141g are arranged on the downstream side of air stream A2 with respect to heat resistors 141a. Temperature detection resistor 141d, 141e and temperature detection resistors 141f and 141g compose a bridge circuit. When the flow direction of air stream A2 is in a direction shown by arrow A2, that is, air stream is a forward flow in which air is inhaled from an air cleaner to the engine, the temperature of temperature detection resistors 141d and 141e becomes lower than that of temperature detection resistors 141f and 141g, and error amplifier AMP2 outputs a positive output. The absolute value of the output corresponds to the flowing air amount. On the other hand, the temperature of temperature detection resistors 141f and 141g become lower than the that of temperature detection resistors 141d and 141e when the flow direction of air stream A2 is opposite to the direction of arrow A2, that is, the air flows backward from the engine to the air cleaner, and error amplifier AMP2 outputs a negative output. The absolute value of the output corresponds to the flowing air amount. When the flow of the intake air is a following current, output Vin2 of error amplifier AMP2 becomes a positive output, and when flowing backward, it becomes a negative output. It is, therefore, possible to measure the amount of the intake air which includes the pulsation of the intake air.

Heat resistor 141a is one that the thin film or thick film of the polysilicon resistance body, and platinum or tungsten as a heating unit are formed on the base such as the flat glass, the ceramic, and silicon for instance. Therefore, heat resistor 141a has small heat capacity, and improved response. Further, the detection of the two way flow which includes the backflow becomes possible by using temperature detection resistors 141d, 141e, 141f, and 141g. This method may cause the error easily in the static characteristic due to the pulsation influence if high-speed sampling etc. are not carried out when the air flow rate is leveled while the change of the flow can be detected easily.

First air flow meter 16 which is effective in the detection of the static characteristic is arranged on the upstream side of throttle valve 17, and second air flow meter 14 effective in the transition characteristic which can detect the backflow is arranged on the downstream side in this embodiment as explained above. Accordingly, the measuring accuracy can be improved overall by using effectively two kinds of different air flow meters.

Next, the configuration of the air flow rate correction means in the throttle-integrated air flow meter according to this embodiment will be explained by using FIG. 5.

Figure 5:
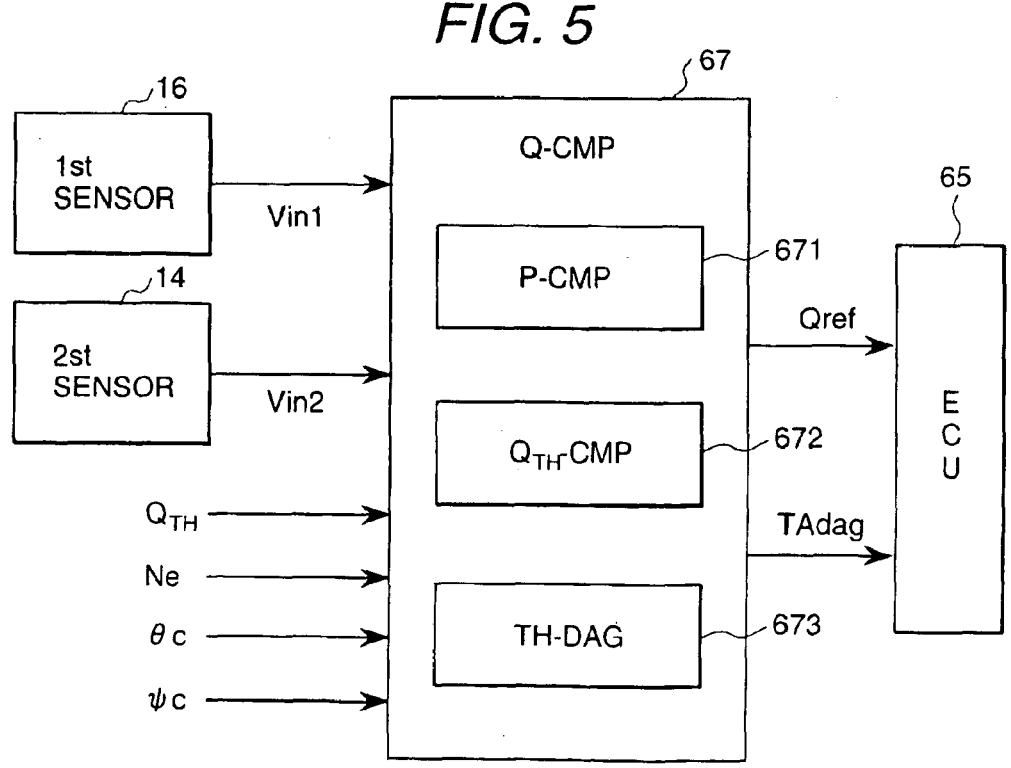
FIG. 5 is a block diagram showing the configuration of the air flow rate correction means in the throttle-integrated air flow meter according to the first embodiment of the present invention.

FIG. 5 is a block diagram showing the configuration of the air flow rate correction means in the throttle-integrated air flow meter according to the first embodiment of the present invention.

Air flow rate correction means (Q-CMP) 67 comprises: pulsation compensating means (P-CMP) 671, throttle opening compensating means (θTH-CMP) 672, and throttle diagnosis processing means (TH-DAG) 673. Air flow rate correction means 67 inputs output Vin1 of the first air flow meter 16, output Vin2 of the second air flow meter 14, throttle opening θTH output from throttle drive circuit 661 shown in FIG. 2, engine revolution speed Ne and crank angle θTH output from the crank angle sensors 6, 7 shown in FIG. 1, and cam phase φc. Air flow rate correction means 67 outputs corrected air flow rate Qref and diagnosis result TAdag of the throttle to the engine control unit 65 based on these input signals.

Next, the operation of pulsation compensating means 671 in the throttle-integrated air flow meter according to this embodiment will be explained by using FIG. 6 and FIG. 7.

Figure 6:
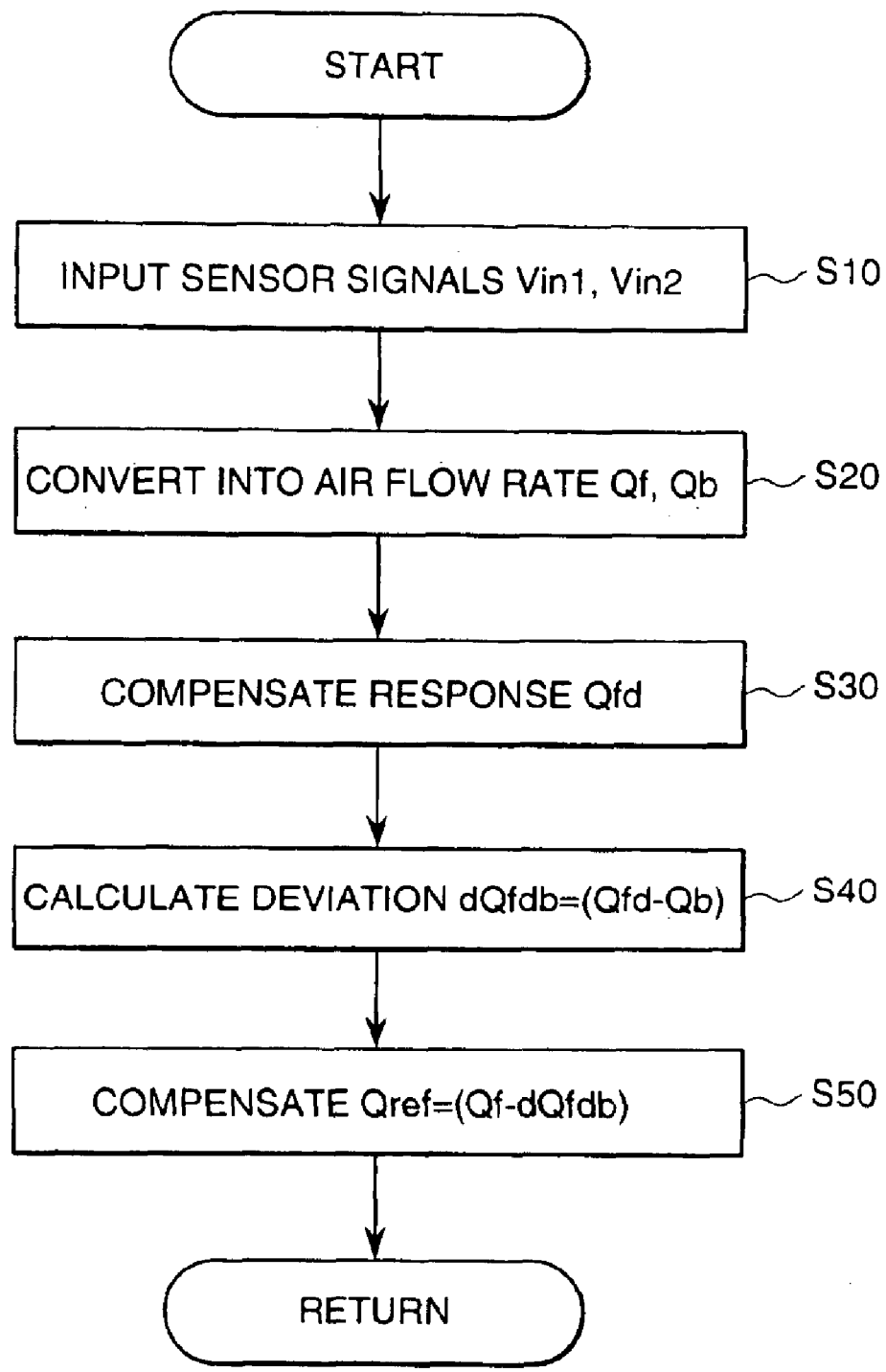
FIG. 6 is a flow chart showing the operation of the pulsation compensating means in the throttle-integrated air flow meter according to the first embodiment of the present invention.
Figure 7:
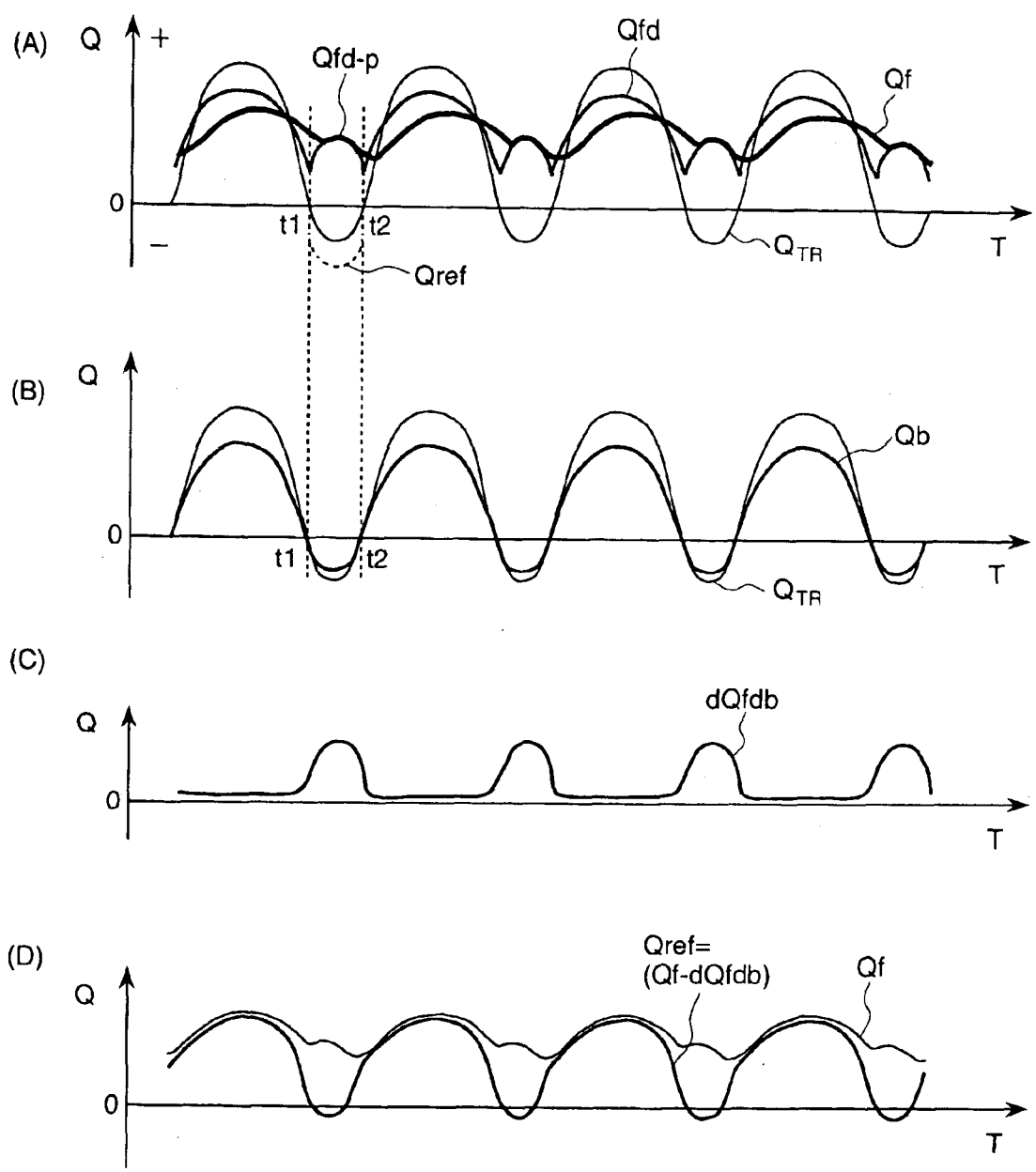
FIG. 7 is a waveform view showing the operation of the pulsation compensating means in the throttle-integrated air flow meter according to the first embodiment of the present invention.

FIG. 6 is a flow chart showing the operation of the pulsation compensating means in the throttle-integrated air flow meter according to the first embodiment of the present invention. FIG. 7 is a waveform view showing the operation of the pulsation compensating means in the throttle-integrated air flow meter according to the first embodiment of the present invention. in FIG. 7(A)–FIG. 7(D), the axis of ordinate designates air flow rate Q, and the axis of abscissa time T.

Pulsation compensating means 671 makes compensation the air flow which includes the backflow when pulsating, and it is used to measure the air stream especially inhaled into each cylinder of the engine accurately. It is used to reduce the error when the backflow is generated by the variable valve operation etc. The characteristic when pulsing including the backflow can be improved in combining two or more sensors with a different response.

Pulsation compensating means 671 takes output Vin1 of the first air flow meter 16 and output Vin2 of the second air flow meter 14 in step s10.

Next in step s20, pulsation compensating means 671 converts output Vin1 of first air flow meter 16 and Output Vin2 of second air flow meter 14 into air flow rate Qf and Qb respectively. The conversion from output Vin of the air flow meter to air flow rate Q is carried out by using the map etc. memorized beforehand for the relation between both.

Next, pulsation compensating means 671 compensates the response of the signal of air flow rate Qf measured by first air flow meter 16 in step s30.

Here, actual air flow rate QTR is a pulsation flow in which the positive flow rate and the negative flow rate alternately appear as shown in FIG. 7(A). On the other hand, the backflow (negative flow rate) can not be detected from air flow rate Qf detected by the first air flow meter 16 as shown in FIG. 7(A), and it has the response delay. This is because first air flow meter 16 is unsuitable for the measurement of the flow direction, have not high speed response, but the delay of the response, although it has comparatively large heat capacity as mentioned above, and is excellent in the detection of the static characteristic.

Then, in step s30, pulsation compensating means 671 compensates the response delay of the signal of air flow rate Qf measured by first air flow meter 16, and obtains response compensatory signal Qfd in which the response delay is recovered. The compensating operation of the response delay is performed for instance as follows. Assumed that the values obtained by sampling air flow rate Qf at fixed interval time are Qf(t1), Qf(t2), Qf(t3), . . . . Qfd(t1)=(Qf(t1)−Qf(t2)×k1+Qf(t1)). Here, k1 is an arbitrary constant. The compensating operation of the response delay may be carried out by using another method.

Response compensatory signal Qfd is a signal that the backflow part (negative part) of actual flow rate QTR becomes positive as shown in FIG. 7(A).

Next, pulsation compensating means 671 calculates the deviation in step s40. The level of the following current and the backflow is influenced by the flow rate dependency etc. of the sensor, and mean value shifts somewhat, although output Qb of the second air flow meter 14 keeps the phase relation of the backflow to actual flow rate good as shown in FIG. 7(B). Especially, in the downstream of the throttle, the waveform changes easily due to the backflow.

In the deviation operation in step s40, difference (Qfd−Qb) between output Qb of the second air flow meter 14 and response compensatory signal Qfd obtained in step s30 is calculated to obtain pulsation correction signal dQfdb. Pulsation correction signal dQfdb is a signal to emphasize only the error when flowing backward as shown in FIG. 7(C).

Next, pulsation compensating means 671 performs the correction operation in step s50. The difference between output Qf of the first air flow meter 16 and pulsation correction signal dQfdb is obtained by the correction operation. Fixed coefficient k2 is multiplied by pulsation correction signal dQfdb at that time, and air flow rate Qref corrected is obtained as difference (Qf−k2·dQfdb). As a result, the backflow error can be decreased from the signal including the backflow error.

The intake air of each of cylinders can be measured accurately by carrying out the operation processing of the above steps s10–s50 at once every sampling time.

A similar effect can be achieved even if the correction is made by paying attention to the backflow phase relation of output Qb of air flow meter 14, although the pulsation correction is made by using the difference of two flow meters in the above-mentioned description. In this, the polarity of signal Qfd in which the response delay is recovered is reversed for the period of output Qb of air flow meter 14 being at the backflow phase (For instance, during time t1–t2 of FIG. 7(B)) (to obtain air flow rate Qref' corrected by reversing the polarity of pulsation signal Qfd-p of FIG. 7(A)). For example, the polarity of signal Qfd in which the response delay is recovered and the polarity of pulsation signal Qfd-p of FIG. 7(A) are reversed for the period of output Qb of air flow meter 14 being at the backflow phase, for instance, during time t1–t2 of FIG. 7(B) to obtain air flow rate Qref' corrected. The influence on the content of the correction of the air flow rate can be reduced according to this method even if the direct current level of air flow meter 14 changes.

In pulsation compensating means 671 as explained above, the error for the pulsation included in the output of the first air flow meter 16 can be corrected by using the output of the second air flow meter 14 to obtain air flow rate signal Qref corrected for the pulsation.

Next, the operation of throttle opening compensating means 672 in the throttle-integrated air flow meter according to this embodiment will be explained by using FIG. 8.

Figure 8:
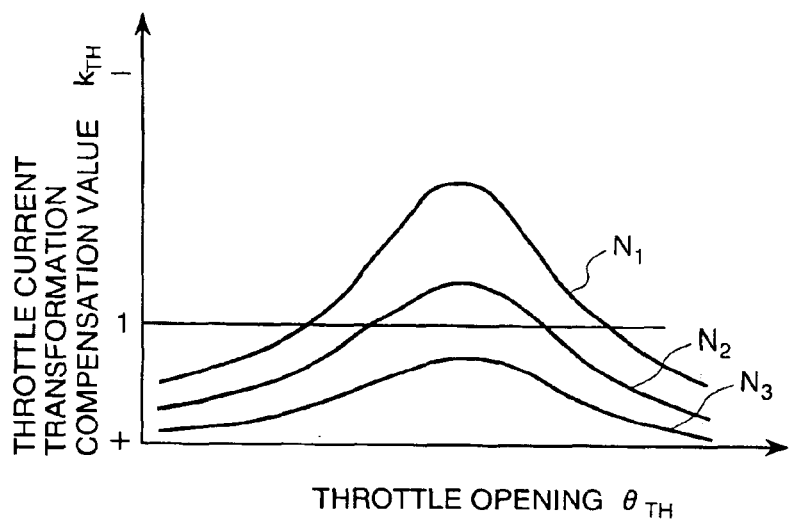
FIG. 8 is an illustration showing the operation of the throttle opening compensating means in the throttle-integrated air flow meter according to the first embodiment of the present invention.

FIG. 8 is an illustration of the operation of the throttle opening compensating means in the throttle-integrated air flow meter according to the first embodiment of the present invention.

If throttle valve 17 and sensor part 161 of the air flow meter are integrated in configuration as shown in FIG. 2, Air flow meters 16 and 14 come to be influenced easily by the difference of the throttle opening because they are arranged in the neighborhood of throttle valve 17. Flow velocity is almost constant in the vicinity of throttle opening fully opened except the vicinity of the wall of the throttle body. However, When the throttle valve is shut, the air flows only from the space between the throttle valve and the throttle body. Therefore, the flow velocity in the vicinity of the center of the throttle body is small, it is large near the flow of air on the both sides. Further, the flow velocity becomes small in the vicinity of the wall of the throttle body. The error comes to cause in the measurement result of the air flow rate by the air flow meter when the flow velocity changes according to the throttle opening even if the amount of the intake air is constant.

Then, throttle opening compensating means 672 shown in FIG. 5 compensates the error by the throttle opening by using the correction values of the throttle current transformation shown in FIG. 8. FIG. 8 shows the relationship between throttle opening θTH and correction values kTH of the error due to the throttle valve current transformation. The error due to the current transformation of the throttle opening shows the tendency to grow in the middle of the throttle opening compared with the full close and the full open of the throttle opening. Further, because the error due to the throttle opening changes depending on the condition of the engine speed, throttle opening compensating means 672 has a map by which throttle current transformation correction value kTH is obtained from throttle opening θTH and engine revolution speed N (N1,N2,N3) as shown in FIG. 8. Throttle opening compensating means 672 can obtain throttle current transformation correction value kTH according to throttle opening θTH and engine revolution speed N by using the map shown in FIG. 8. Air flow rate correction means 67 can output air flow rate Qref corrected by multiplying the correction value obtained by throttle opening compensating means 672 by the corrected air flow rate obtained by pulsation compensating means 671.

The correction data shown in FIG. 8 can be obtained by learning and measuring automatically so that the difference of two air flow meters may become constant under a constant condition, and storing the data. It is possible to decrease the current transformation error anytime by executing this every time at the engine starting etc.

Air flow meter 14 in the throttle downstream can be assumed to be a detachable structure when the current transformation error is corrected only when adjusting the air flow meter before shipping. the current transformation error be memorized as correction data with the error when pulsing mentioned above. Thereby, the correction becomes enable. The manufacturing cost increases if the air flow meters are arranged in the top and the bottom of the throttle valve because the number of heat resistors increases. However, the manufacturing cost is decreased by installing air flow meter 14 detachable only when adjusting. Further, the accuracy of measurement of the air flow rate can be improved by correcting the current transformation error.

The current transformation error can be decreased by using the throttle opening compensating means in this embodiment as explained above.

Figure 10:
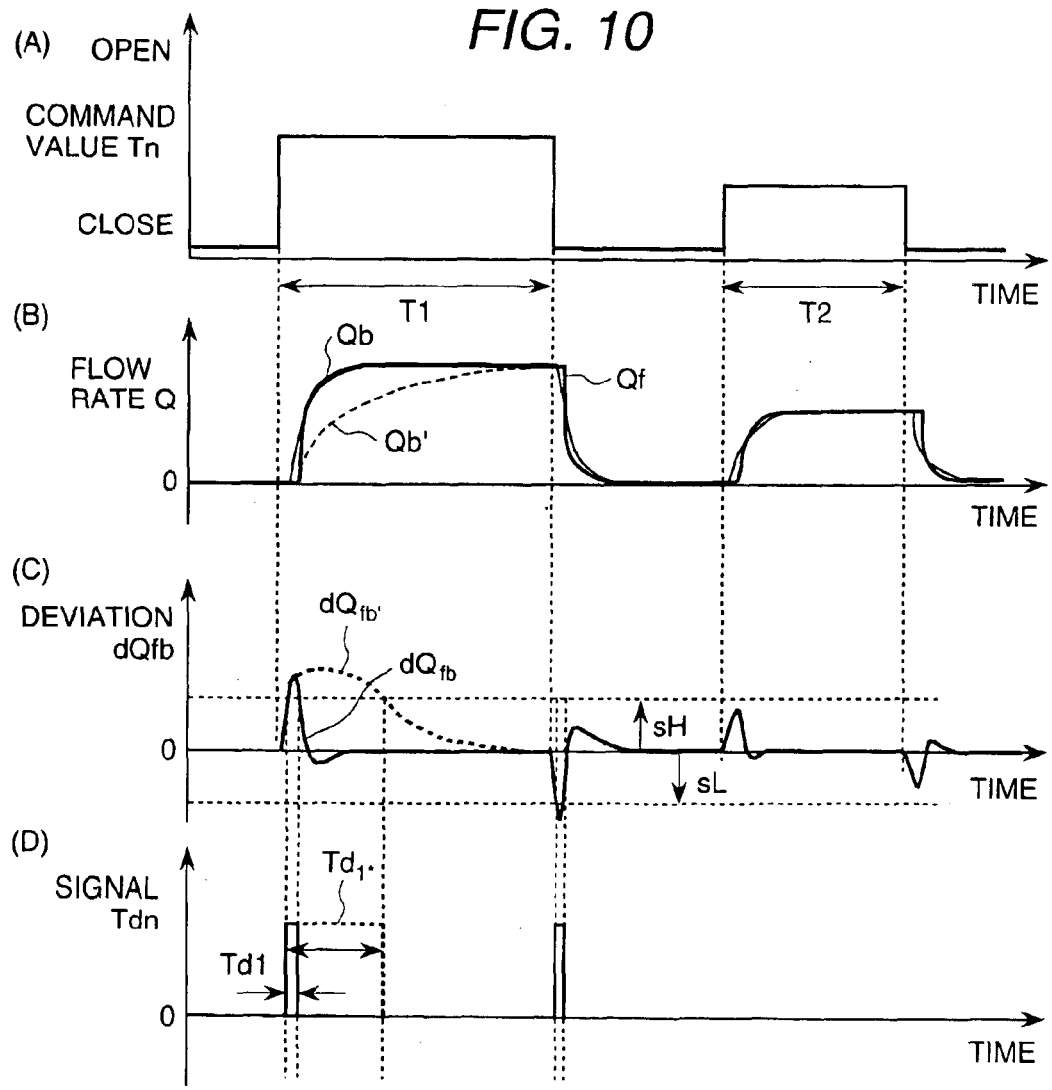
FIG. 10 is a waveform view showing the operation of the throttle diagnosis processing means in the throttle-integrated air flow meter according to the first embodiment of the present invention.

Next, the operation of throttle diagnosis processing means 673 in the throttle-integrated air flow meter according to this embodiment will be explained by using FIG. 9 and FIG. 10.

Figure 9:
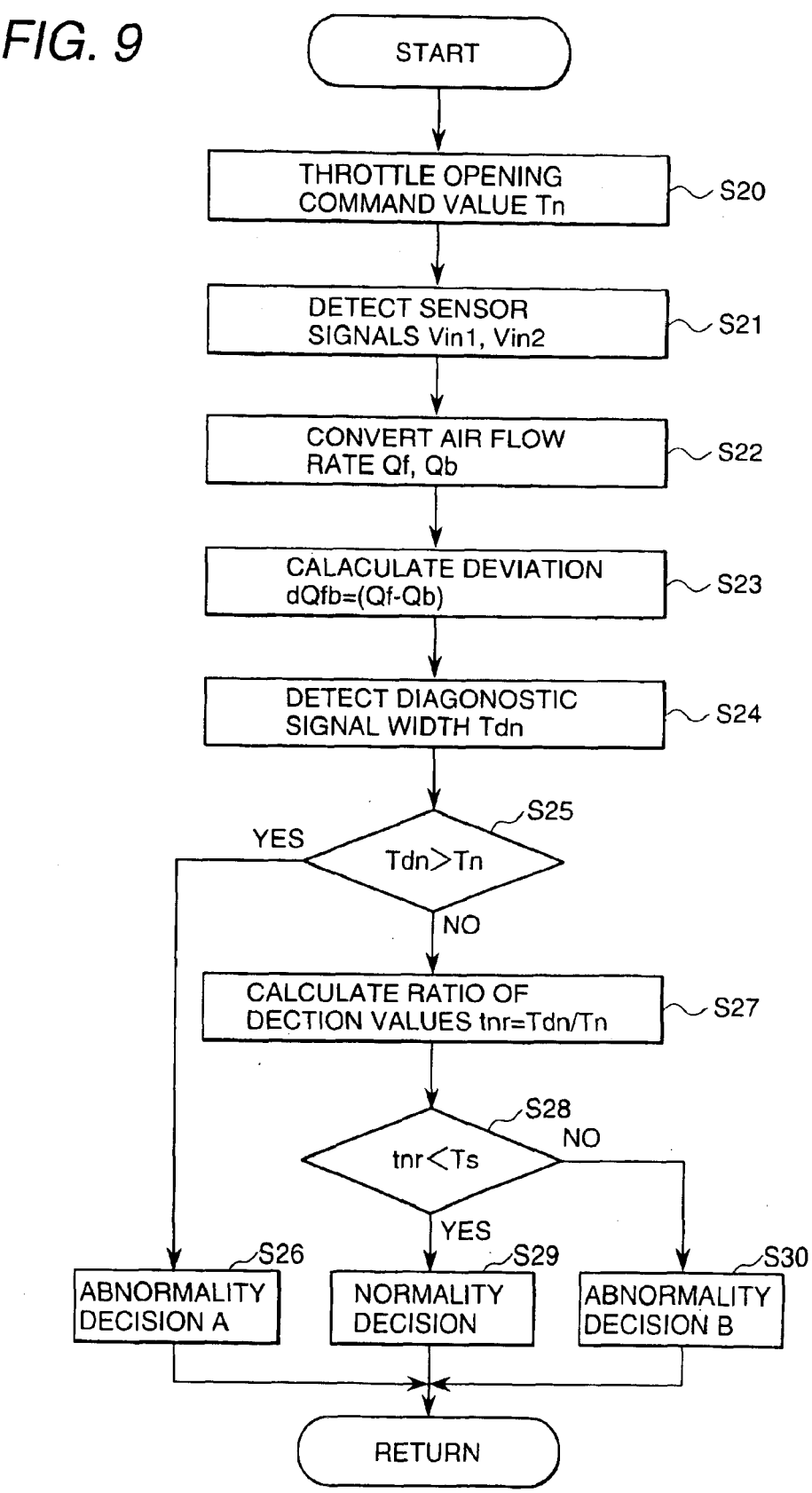
FIG. 9 is an illustration showing the operation of the throttle diagnosis processing means in the throttle-integrated air flow meter according to the first embodiment of the present invention.

FIG. 9 is a flow chart showing the operation of the throttle diagnosis processing means in the throttle-integrated air flow meter according to the first embodiment of the present invention. FIG. 10 is a waveform view illustrating the operation of the throttle diagnosis processing means in the throttle-integrated air flow meter according to the first embodiment of the present invention. In FIG. 10(A)–FIG. 10(D), the axis of abscissas designates time T. The ordinate of FIG. 10(A) designates throttle opening instruction Tn, the ordinate of FIG. 10(B) designates air flow rate Q, the ordinate of FIG. 10(C) designates deviation signal dQfb, and FIG. 10(D) diagnosis signal width signal Tdn.

Throttle diagnosis processing means 673 judges the operation condition to the throttle opening instruction from the comparison of signals of air flow meters 14, 16 arranged at the top and bottom of throttle valve 17 and 16 at the switching action, and does the operation diagnosis of throttle valve 17 without a throttle opening sensor etc.

Throttle diagnosis processing means 673 outputs throttle opening instruction value Tn instep s20 of FIG. 9. Throttle opening instruction value Tn switches time T which indicates the throttle opening as shown in FIG. 10(A) to plural stages like T1, T2, . . . . The processing in steps s20–s30 are executed one by one for the instruction value when throttle opening instruction value T1 is output first. When the diagnosis processing to throttle opening instruction value T1 ends, the following throttle opening instruction value T2 is output in step s20, and the processing is executed one by one for the instruction value. When the diagnosis processing to throttle opening instruction value T1 ends, the processing to the following throttle opening instruction value T3 is executed. The processing is executed one by one for two or more throttle opening instruction values Tn in a similar way.

In step s21 next, throttle diagnosis processing means 673 detects output signal Vin1 and Vin2 of the first and the second air flow meters, respectively.

Next, in step s22, throttle diagnosis processing means 673 converts detected output signals Vin1 and Vin2 into air flow rate Qf and Qb, respectively. When air flow rate Qf changes, for example, into the air flow rate as shown in FIG. 10(B) for throttle opening instruction T1, the air flow rate in the downstream of the throttle valve changes like air flow rate Qb of FIG. 10(B) when the throttle valve works normally. On the other hand, the air flow rate in the downstream of the throttle valve changes like air flow rate Qb' of FIG. 10(B) if the response delay etc. occurs when the throttle valve opens.

Next, throttle diagnosis processing means 673 calculates deviation dQfb(=Qf−Qb) of the air flow rate within the instruction time T1 in step s23. Deviation dQfb changes as shown in FIG. 10(C) when the opening of the throttle valve is normal. On the other hand, because the increase in the air flow rate in the downstream of the throttle valve is delayed when the opening of the throttle valve is abnormal, deviation dQfb changes remarkably compared with the above normal case as shown in FIG. 10(C).

Next, in step s24, throttle diagnosis processing means 673 compares deviation dQfb of the air flow rate with a constant diagnosis level sH, and outputs the width of the part at the level higher than the diagnosis level sH as diagnosis signal width signal Td1 as shown in FIG. 10(D). Diagnosis signal width signal Td1' under abnormal circumstances is output when the response delay occurs in the throttle valve. Similarly, a negative diagnosis level sL is provided, and diagnosis signal width signal Td1 is obtained similarly by using this diagnosis level sL.

Next, in step s25, throttle diagnosis processing means 673 judges whether diagnosis signal width signal Td1 is larger than throttle opening instruction T1 in step s20. The state when diagnosis signal width signal Td1 is larger than throttle opening instruction T1 shows that the throttle valve does not open for instance due to the breakdown of the motor etc. at all. Throttle diagnosis processing means 673 judges as abnormal judgment A in step s26 at this time. Abnormal judgment A means a breakdown such as motors.

On the other hand, when diagnosis signal width signal Td1 is not larger than throttle opening instruction T1, throttle diagnosis processing means 673 calculates ratio t1r(=Td1/T1) of diagnosis signal width signal Td1 and throttle opening instruction T1 in step s27.

Next, in step s28, throttle diagnosis processing means 673 judges whether ratio t1r is smaller than fixed reference level Ts. In the small situation, throttle diagnosis processing means 673 determines that the throttle valve works normally because the difference of the air streams in the upstream and the downstream of the throttle valve is little in step s29.

On the other hand, when ratio t1r is not smaller than fixed reference level Ts, throttle diagnosis processing means 673 judges as abnormal judgment B of the throttle valve vein step s30. Abnormal judgment B means that the response gain of the control unit is bad, the throttle valve does not work with good response.

The accuracy of an abnormal judgment can be improved by outputting two or more throttle opening instruction values Tn, and understanding the operational state under different conditions in step s20 because the abnormality of system including the air flow meter may occur despite normal appearance.

As mentioned above, the operation diagnosis of the throttle becomes possible even if the throttle opening signal is not used, and the safety of the system improves in this embodiment. There is an effect that the accuracy of the measurement can be improved even when pulsing including the current transformation and the backflow of the throttle. This method is also applied to the diagnosis of the variable valve.

In this embodiment as explained above, the corrected air flow rate signal for the pulsation can be obtained by installing the air flow meter in the upstream and the downstream of the throttle valve respectively, and correcting the error for the pulsation included in the output of the first air flow meter by the output of the second air flow meter in the air flow rate correction means. Further, the current transformation error can be decreased. In addition, the operation diagnosis of the throttle becomes possible even if the throttle opening signal is not used, and the safety of the system is improved.

Next, the configuration and operation of the air flow meter according to the second embodiment of the present invention will be explained by using FIG. 11–FIG. 13.

First, the whole configuration of internal combustion engine which installs the air flow meter according to this embodiment will be explained by using FIG. 11.

Figure 11:
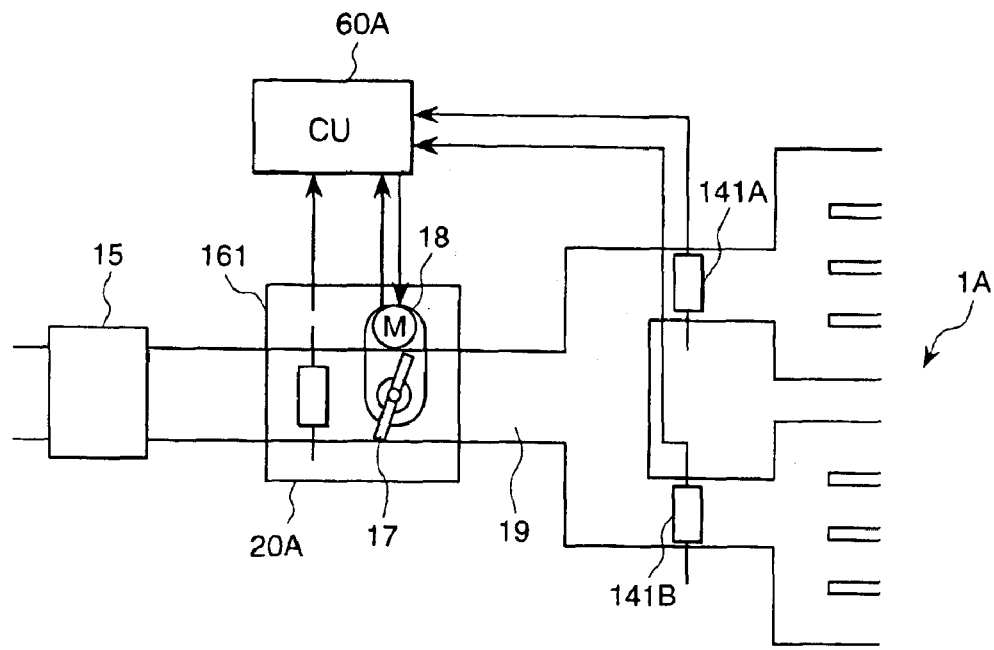
FIG. 11 is a system configuration view showing the whole configuration of an internal combustion engine which has the air flow meter according to the second embodiment of the present invention.

FIG. 11 is a system configuration view showing the whole of internal combustion engine which installs the air flow meter according to the second embodiment of the present invention. The same sign as FIG. 1 designates the same part.

The engine 1A in this embodiment has more than four cylinders, and eight cylinders or two banks of four cylinders in the example shown in Figure. It is possible to distinguish the signal of each cylinder by installing the air flow meter in the upstream and the downstream of the throttle valve in this embodiment.

The throttle-integrated air flow meter 20A including throttle valve 17, motor 18, and first sensor part 161 is installed in intake port 19. The first sensor part 161 is arranged in the upstream of throttle valve 17. The throttle-integrated air flow meter 20A is connected to control unit 60A, sensor actuator driving means 66, air flow rate correction means 67, and engine control unit 65 are provided in control unit 60A as shown in FIG. 2.

First sensor drive circuit 662 which drives the first sensor part 161 and throttle drive circuit 661 which drives and throttle valve 17 are provided in sensor actuator driving means 66. In addition, second sensor parts 141A and 141B are installed on the downstream side of the throttle valve, and in the downstream of the branch connection of two parts of four cylinders and the upstream side of the branch connection of each of the cylinders. Second sensor drive circuit which drives second sensor parts 141A and 141B respectively is installed in sensor actuator driving means 66 of control unit 60A.

The judgment of the signal of each cylinder becomes possible by at least one air flow meter although two air flow meters are provided on the downstream side of the throttle valve in the above-mentioned explanation.

Next, the operation of control unit in the throttle-integrated air flow meter according to this embodiment will be explained by using FIG. 12 and FIG. 13.

Figure 12:
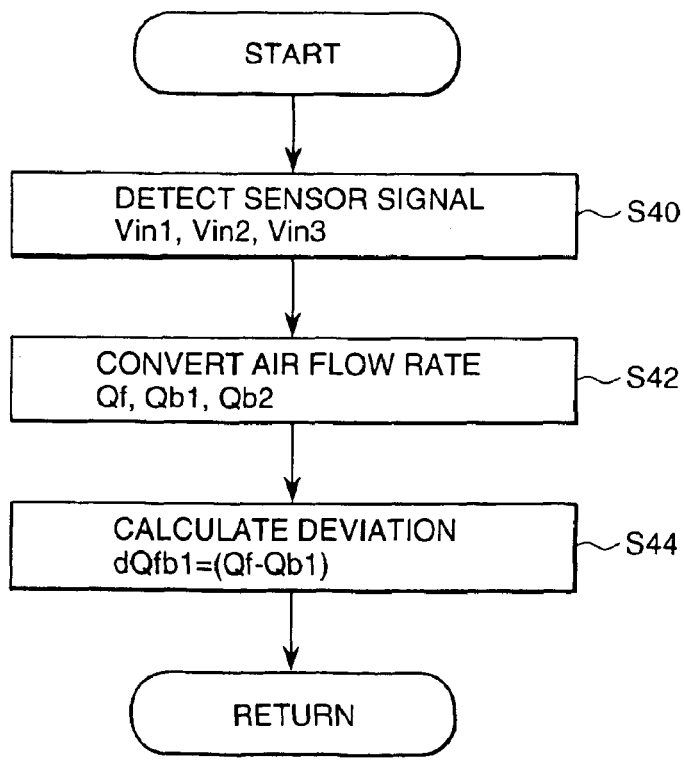
FIG. 12 is a flowchart showing the operation of a control unit in the throttle-integrated air flow meter according to the second embodiment of the present invention.
Figure 13:
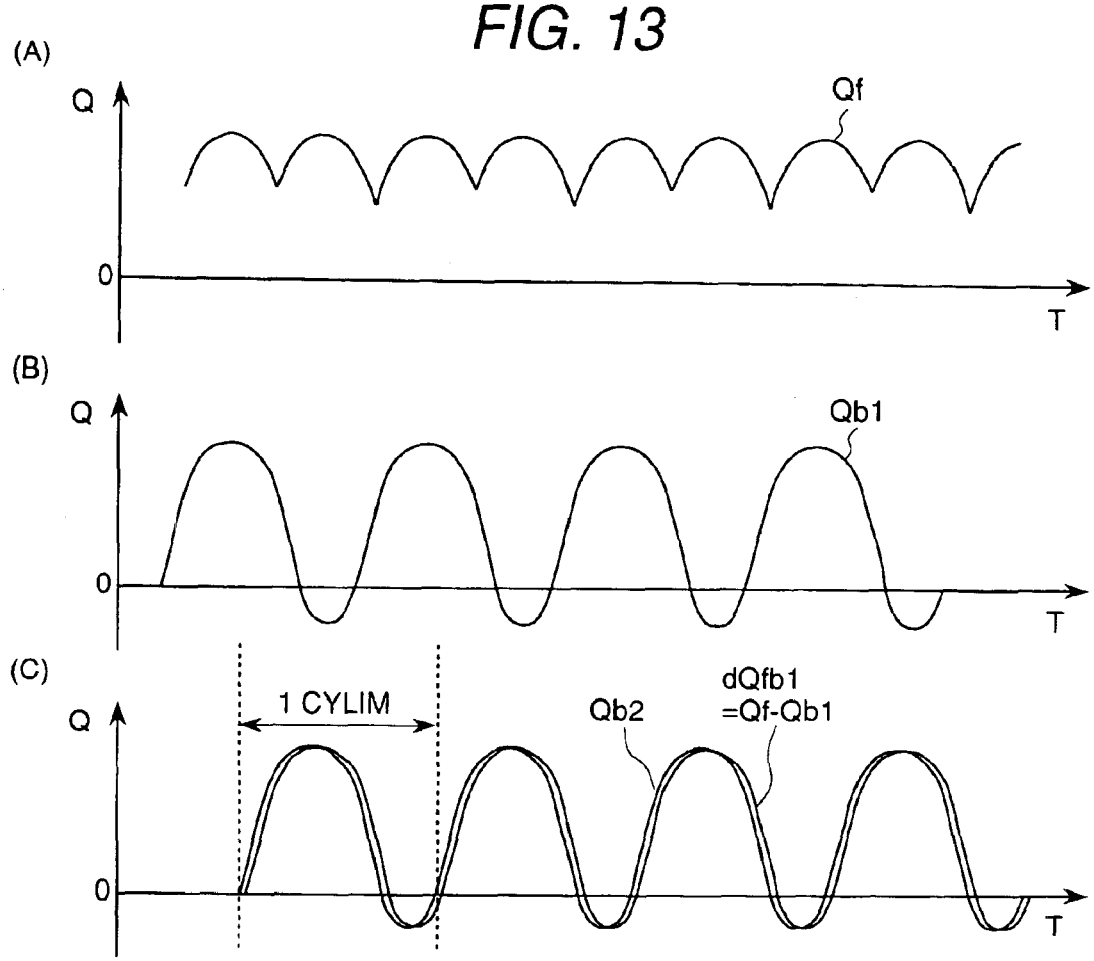
FIG. 13 is a flowchart showing the operation of a control unit in the throttle-integrated air flow meter according to the second embodiment of the present invention.

FIG. 12 is a flow chart showing the operation of control unit in the throttle-integrated air flow meter according to the second embodiment of the present invention. FIG. 13 is a waveform diagram showing the operation of control unit in the throttle-integrated air flow meter according to the second embodiment of the present invention.

In step s40 of FIG. 12, control unit 60A detects output signals Vin1, Vin2, and Vin3 of first and second air flow meter which includes the first sensor part 161 and the second sensor parts 141A, 141B, respectively.

Next, in step s42, control unit 60A converts detected output signals Vin1, Vin2, and Vin3 into air flow rate Qf, Qb1, and Qb2, respectively. Air flow rate Qf is as shown in FIG. 13(A). Here, certain backflow can not be detected in the first air flow meter because the waveform may be synthesized in the upstream of the throttle even when the backflow is caused in each cylinder by the interference of four cylinders and four cylinders of the downstream side. On the other hand, air flow rate Qb1 and Qb2 are as shown in FIG. 13(B) and FIG. 13(C), respectively.

Next, control unit 60A calculates difference dQfb1(=Qf−Qb1) between output Qb1 of one bank and output Qf of the first air flow meter in step s44. As a result, the flow rate which includes the backflow of one cylinder (1cylind) of the other bank can be detected.

In addition, difference (Qb2−dQfb1) of the measurement with the air flow meter on the upstream side can be obtained by comparing difference dQfb1(=Qf−Qb1) with output Qb2 of the other bank, or taking the difference for instance. That is, although the air flow rate which flows from one bank to the other bank cannot be measured in the air flow meter of the upstream, it becomes possible to obtain as difference (Qb2−dQfb1) in this embodiment. In addition, the accuracy of the discretion signal to each cylinder can be improved by making the error correction by using this difference signal.

Especially, the thermal type air flow meter has the feature that the mass flow rate can be achieved directly even if neither a lot of calculation nor maps, etc. are used. Therefore, there is a feature of obtaining the air flow rate classified into the cylinders in a multi-function engine by carrying out brief calculation. Accordingly, the control of a car engine can be optimized, and exhaust gas from the engine can be decreased.

The signal of each cylinder in the engine more than four cylinders can be distinguished according to this embodiment as explained above.

Next, the whole configuration of an internal combustion engine which installs the air flow meter according to the third embodiment of the present invention will be explained by using FIG. 14.

Figure 14:
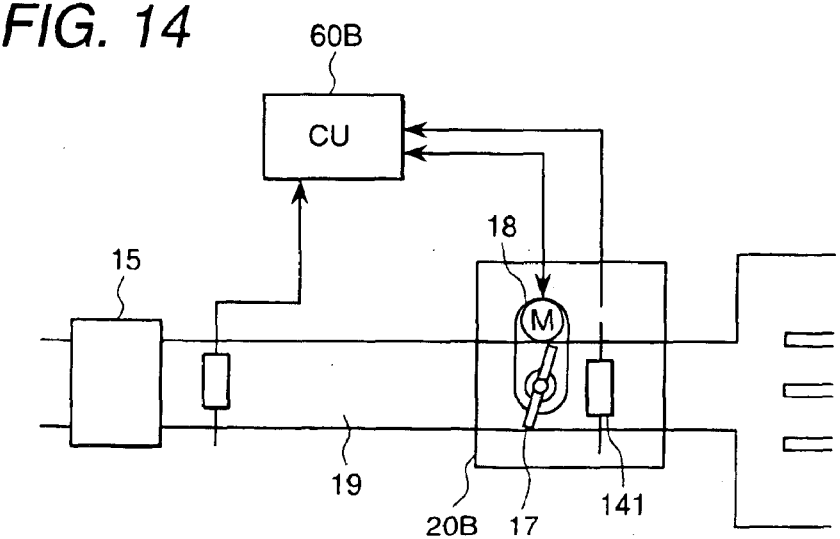
FIG. 14 is a system configuration view showing the whole configuration of an internal combustion engine which has the air flow meter according to the third embodiment of the present invention.

FIG. 14 is a system configuration view showing the whole configuration of an internal combustion engine which has the air flow meter according to the third embodiment of the present. The same sign as FIG. 1 designates the same part.

Throttle-integrated air flow meter 20B comprising throttle valve 17, motor 18, and second sensor part 141 is installed in intake port 19. The second sensor part 141 is arranged in the downstream of throttle valve 17. Throttle-integrated air flow meter 20B is connected to control unit 60B, sensor actuator driving means 66, air flow rate correction means 67, and engine control unit 65 are installed in control unit 60B as shown in FIG. 2. First sensor drive circuit 663 which drives second sensor part 141 and throttle drive circuit 661 which drives throttle valve 17 is provided in sensor actuator driving means 66. Throttle-integrated flow meter 20B is arranged just before the branch part of the cylinders of the engine. In addition, second sensor part 161 is arranged in the upstream of throttle valve 17, and immediately after the air cleaner where the pulsation influence is comparatively small. First sensor drive circuit which drives first sensor part 161 is installed in sensor actuator driving means 66 of control unit 60B.

It becomes possible to utilize the feature of each air flow meter more effectively according to the configuration like this. It becomes possible to detect suitably and correct the influence of the change in flow rate of each cylinder by arranging the air flow meter just before the cylinder.

Next, the whole configuration of an internal combustion engine which installs the air flow meter according to the fourth embodiment of the present invention will be explained by using FIG. 15.

Figure 15:
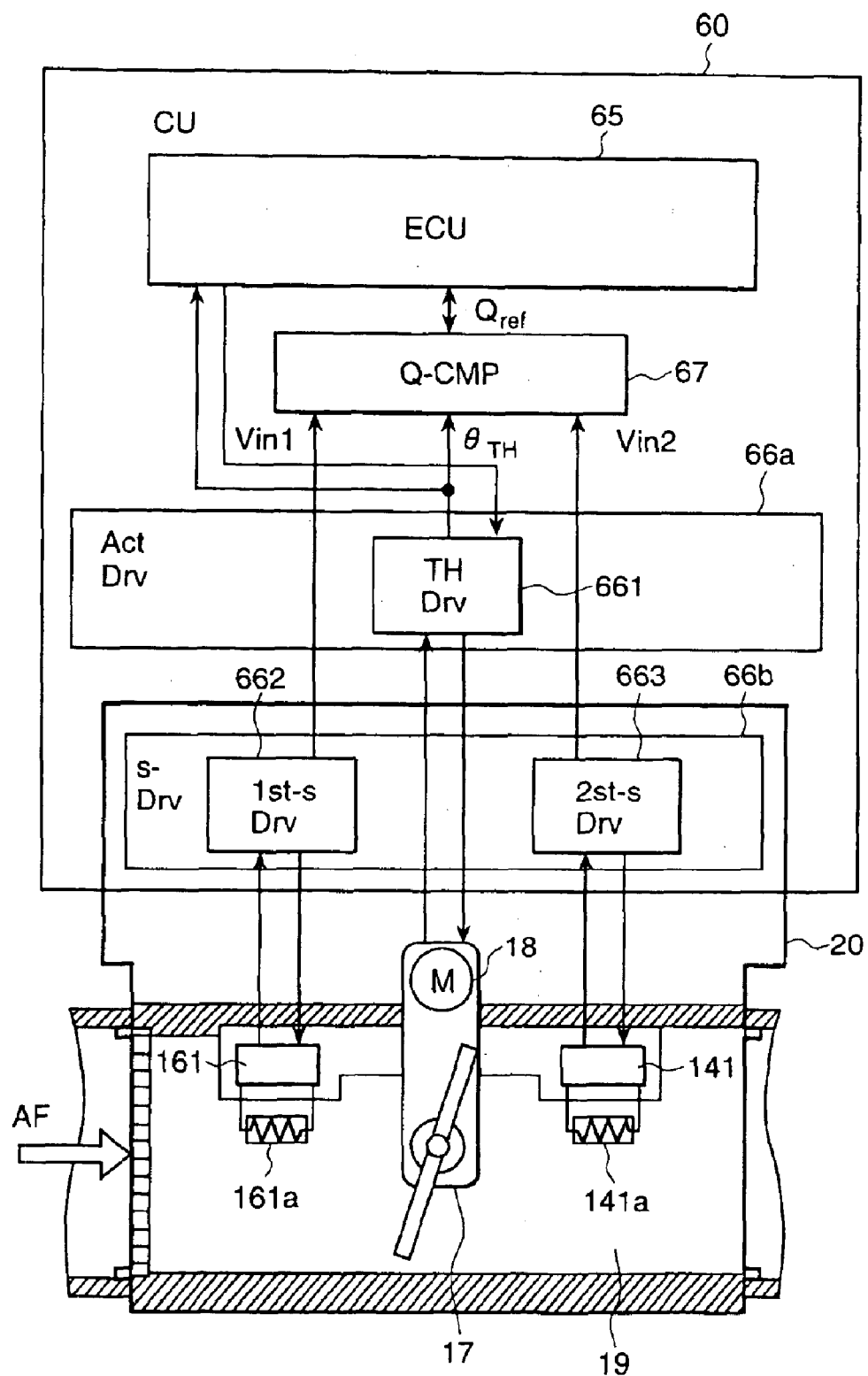
FIG. 15 is a system configuration view showing the whole configuration of an internal combustion engine which has the air flow meter according to the fourth embodiment of the present invention.

FIG. 15 is a system configuration view showing the whole configuration of an internal combustion engine which has the air flow meter according to the fourth embodiment of the present. The same sign as FIG. 1 designates the same part.

In this embodiment, throttle-integrated flow meter 20 has the configuration that sensor drive 66b is integrated in the throttle body shown in FIG. 2 together with as actuators such as motors and sensors. The same effect as each of the embodiments mentioned above can be achieved even in this case though the positions of connecting wires are different. Further, because the sensor with the minimum function is mounted, the individual adjustment of the sensor can be easily done.

Next, the whole configuration of an internal combustion engine which installs the air flow meter according to the fifth embodiment of the present invention will be explained by using FIG. 16.

Figure 16:
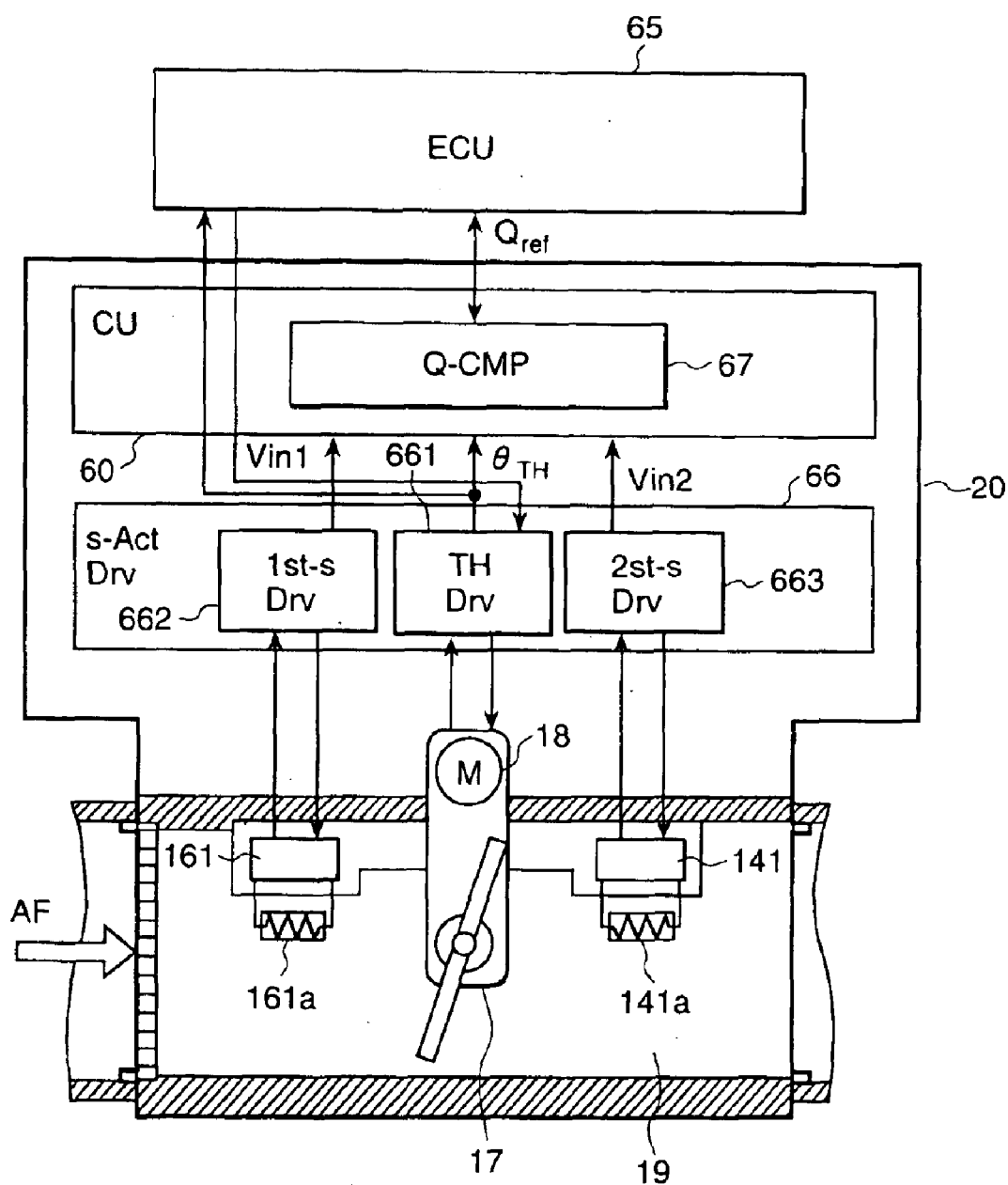
FIG. 16 is a system configuration view showing the whole configuration of an internal combustion engine which has the air flow meter according to the fifth embodiment of the present invention.

FIG. 16 is a system configuration view showing the whole configuration of an internal combustion engine which has the air flow meter according to the fifth embodiment of the present. The same sign as FIG. 1 designates the same part.

In this embodiment, engine controller 65 is provided outside, only the part that controls the throttle and converts into the air flow rate based on signals of sensors is integrated with throttle-integrated flow meter 20.

In the configuration shown in FIG. 2, it might be influenced by the turbulence of the noise etc. because the connection between throttle-integrated flow meter 20 and controller 60 is made in general with the wire harness etc. On the other hand, Because this embodiment takes a strong configuration for the turbulence of the noise etc., it becomes possible to read an analog signal from the sensor with a high degree of accuracy by the high-speed sampling. Further, it is possible to transmit correctly the value converted into the air flow rate once to engine controller 65 by using the digital communication means. As mentioned above, it becomes possible to decrease the noise etc. and to measure the air flow rate with a high degree of accuracy according to this embodiment.

Next, the whole configuration of an internal combustion engine which installs the air flow meter according to the sixth embodiment of the present invention will be explained by using FIG. 17.

Figure 17:
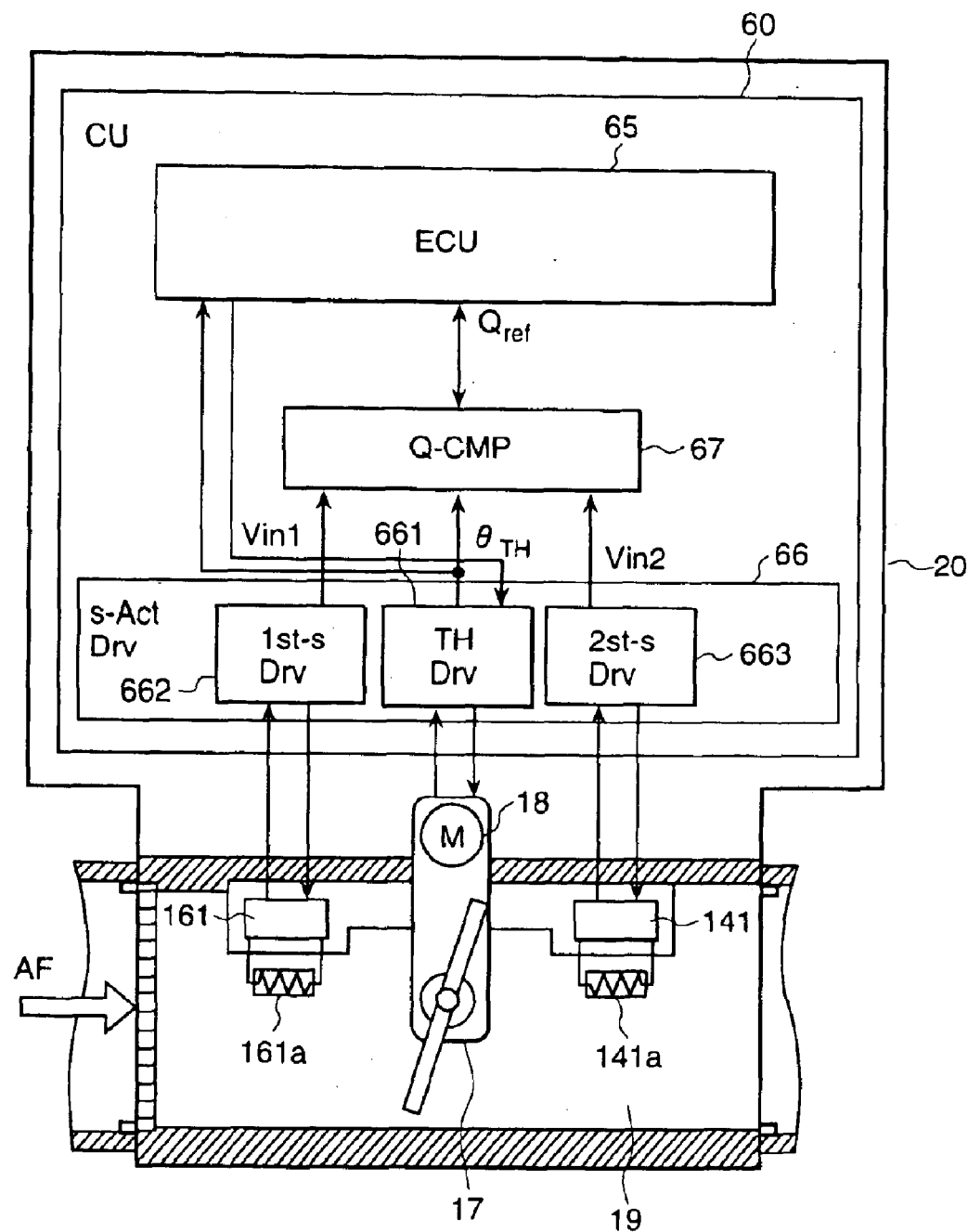
FIG. 17 is a system configuration view showing the whole configuration of an internal combustion engine which has the air flow meter according to the sixth embodiment of the present invention.

FIG. 17 is a system configuration view showing the whole configuration of an internal combustion engine which has the air flow meter according to the sixth embodiment of the present. The same sign as FIG. 1 designates the same part.

In this embodiment, the components including controller 60 are integrated with throttle-integrated flow meter 20. The external wiring (wire harness) between sensor and controller 65 needed in the example of showing to FIG. 2 can be omitted by taking the configuration like this. The communication delay by wire harness when the digital communication means is used and the noise between devices, etc. can be decreased by taking the configuration according to this embodiment. Further, it becomes difficult to provide an electromagnetic noise to the outside by integrating the whole and shielding it, and to receive the influence from the outside. In addition, the manufacturing cost can be decreased by not distributing the controllers, and integrating them as a whole. Further, the part maker can support easily even when something wrong is caused because the component-reduced configuration includes the main components of the air intake system, and the quality management can be done easily.

The error due to the backflow can be decreased according to the present invention.

Further, the measurement error to the change of the opening of the throttle valve can be decreased according to the present invention.

In addition, the operational state of the throttle device can be diagnosed according to the present invention.

Further, the air flow rate of each of the cylinders can be detected according to the present invention.

What is claimed is:

1. An air flow meter comprising:
   a throttle valve installed inside an intake passage of an internal combustion engine and used for opening and closing an intake passage;
   a first air flow rate detecting means installed in an intake passage located in the upstream of said throttle valve;
   a second air flow rate detecting means installed in an intake passage located at the downstream of said throttle valve; and
   a pulsation compensating means for compensating a pulsation in an air flow rate signal of said first air flow rate detecting means based on output signals from said first and second air flow rate detecting means corresponding individual cylinders of said internal combustion engine.

2. An air flow meter of claim 1, wherein
   said pulsation compensating means determines a response compensatory signal Qfd by compensating a response delay of air flow rate signal Qf detected by said first air flow rate detecting means;
   determines a deviation signal dQfdb by subtracting an air flow rate signal Qd detected by said second air flow rate detecting means from said response compensatory signal Qfd; and
   determines an air flow rate signal Qref compensated for pulsation effect by subtracting said deviation signal dQfdb from an air flow rate signal Qf detected by said first air flow rate detecting means.

3. An air flow meter of claim 1, further comprising
   a throttle valve opening compensating means for compensating a deviated flow changing due to throttle valve opening, wherein
   a deviated flow changing due to throttle opening in an air flow rate signal compensated by said pulsation compensating means is corrected based on a compensation value for deviated flow due to throttle opening obtained by said throttle opening compensating means.

4. An air flow meter of claim 1, wherein
   at least one or more of said first and second air flow rate detecting means for a throttle valve are integrated with a body of said throttle valve.

5. An air flow meter of claim 1, wherein
   said first and second air flow rate detecting means for a throttle valve are air flow rate detecting means using a heating resistance, and
   at least one or more are sensors enable to detect a counter flow.

6. An air flow meter of claim 1, wherein
   either of said plural first and second air flow rate detecting means for a throttle valve is detachable to said throttle body, which is installed at manufacturing process and used for adjusting a characteristic.

7. An air flow meter comprising:
   a throttle valve installed inside an intake passage of an internal combustion engine and used for opening and closing an intake passage;
   a first air flow rate detecting means installed in an intake passage located in the upstream of said throttle valve;
   a second air flow rate detecting means installed in an intake passage located at the downstream of said throttle valve; and
   a throttle diagnostic processing means for making a diagnosis of an operation of said throttle valve with respect to an throttle opening reference, and an output signal from signals from said first and second air flow rate detecting means based on individual cylinders of said internal combustion engine and said throttle opening reference.

8. An air flow meter of claim 7, wherein
   said throttle diagnostic processing means detects an abnormal throttle state if a time duration while a deviation signal dQfdb between an air flow rate signal Qf detected by said first air flow rate detecting means and an air flow rate signal Qd detected by said second air flow rate detecting means continues to deviate outside levels sH and sL is judged to be larger than a designated value.

9. An air flow meter of claim 7, wherein at least one or more of said first and second air flow rate detecting means for a throttle valve are integrated with a body of said throttle valve.

10. An air flow meter comprising:

a throttle valve installed inside an intake passage of an internal combustion engine and used for opening and closing an intake passage;

a first air flow rate detecting means installed in an intake passage located in the upstream of said throttle valve;

a second air flow rate detecting means installed in an intake passage located at the downstream of said throttle valve; and a calculating means for estimating an air flow rate corresponding to a single cylinder based on a difference between output signals from said first and second air flow rate detecting means.

11. An air flow meter of claim 10, wherein the first air flow rate detecting means is of a thermal type effective in detecting a static characteristic, and the second air flow meter is of a thermal type effective in detecting a counter flow.

12. An air flow meter of claim 11, wherein the first air flow rate detecting means is a low-speed detecting means, and the second air flow rate detecting means is a high-speed detecting means.

13. An air flow meter of claim 7, wherein the first air flow rate detecting means is of a thermal type effective in detecting a static characteristic, and the second air flow meter is of a thermal type effective in detecting a counter flow.

14. An air flow meter of claim 13, wherein the first air flow rate detecting means is a low-speed detecting means, and the second air flow rate detecting means is a high-speed detecting means.

15. An air flow meter of claim 1, wherein the first air flow rate detecting means is of a thermal type effective in detecting a static characteristic, and the second air flow meter is of a thermal type effective in detecting a counter flow.

16. An air flow meter of claim 15, wherein the first air flow rate detecting means is a low-speed detecting means, and the second air flow rate detecting means is a high-speed detecting means.

* * * * *